United States Patent [19]

Eggen et al.

[11] 4,241,937
[45] Dec. 30, 1980

[54] STEERING COLUMN SUPPORT

[75] Inventors: Hans C. Eggen, Pleasant Ridge; Eugene M. Halajian, Mt. Clemens; Edward L. Danner, Warren; Darrell O. Rogers, Rochester, all of Mich.

[73] Assignee: General Motors Corporation, Detroit, Mich.

[21] Appl. No.: 24,167

[22] Filed: Mar. 26, 1979

[51] Int. Cl.³ .............................................. B62D 1/18
[52] U.S. Cl. .................................... 280/777; 74/492; 280/750
[58] Field of Search .................. 280/777, 750; 74/492; 188/1 C

[56] References Cited

U.S. PATENT DOCUMENTS

| 3,415,140 | 12/1968 | Bien et al. | 280/777 |
| 3,490,255 | 1/1970 | Wight et al. | 70/422 |
| 3,805,636 | 4/1974 | Howes | 74/492 |
| 3,877,319 | 4/1975 | Cooper | 74/492 |

Primary Examiner—Robert R. Song
Attorney, Agent, or Firm—Charles R. White

[57] ABSTRACT

A cantilevered support beam extends laterally from the hinge pillar of the vehicle body to provide stabilized support for energy absorbing steering column remote from forward structure and instrument panel construction to permit highly efficient energy absorbing operation.

3 Claims, 3 Drawing Figures

STEERING COLUMN SUPPORT

This invention relates to vehicle steering column support structures and more particularly to a new and improved cantilevered steering column support beam extending laterally from attachment with a hinge pillar of the vehicle body to releasable connection with a vehicle steering column disposed within the vehicle body.

Various bracket constructions have been employed to support the steering column of the vehicle at a predetermined position within the vehicle body to permit the operator to conveniently steer the vehicle. Generally, these brackets are secured to the support structure forward of the vehicle body such as the instrument panel or fire wall. Such attachments have been quite satisfactory for vehicle applications.

With some small economy type vehicles there is reduced space forward of the steering column so that attachment to other than these forward components is desired to increase crush space for improving the energy absorbing performance of the energy absorbing steering column. Furthermore, with reduced space and lighter components, a new and improved anchorage to stronger vehicle components is desired. Prior to the present invention, a hinge pillar to hinge pillar beam was proposed to support the steering column in position. This beam was however bulky and complex with multiple offset portions to clear all of the components under the instrument panel.

The present invention is drawn to an improvement in a cross beam construction which involves only a single hinge pillar and is drawn in particular to a partial or half beam which picks up support from the door hinge pillar adjacent to the steering column and which is laterally directed toward the other hinge pillar. This cantilevered beam design provides improved torsional rigidity to provide for stabilization of the steering column within the vehicle body. In the preferred embodiment of this invention, an auxiliary bracket is employed which extends upwardly from and attaches the free end of the laterally extending steering column support beam to the cowl bar in the vehicle body for an improved connection with the steering column.

It is a feature, object and advantage of this invention to provide a new and improved laterally extending support beam for an energy absorbing steering column of a vehicle that is cantilevered off of the front door hinge pillar to remove the column support from the crush zone of the vehicle to improve control of column motion in an energy mode of operation.

Another feature, object and advantage of this invention is to provide a new and improved laterally extending cantilevered beam having an outboard end fixed to the vehicle body hinge pillar to provide remote support for steering column of a vehicle which is laterally spaced from the column as opposed to support substantially in line with the steering column.

Another feature, object and advantage of this invention is to provide a new and improved half beam support for a telescopic energy absorbing steering column having an outboard end secured to the hinge pillar and an inboard end providing stabilized support for the column to hold the column in a forwardly extending position for improved energy absorbing operation of the column.

These and other features, objects and advantages of this present invention will be more apparent from the following detailed drawings in which.

Figure 1:
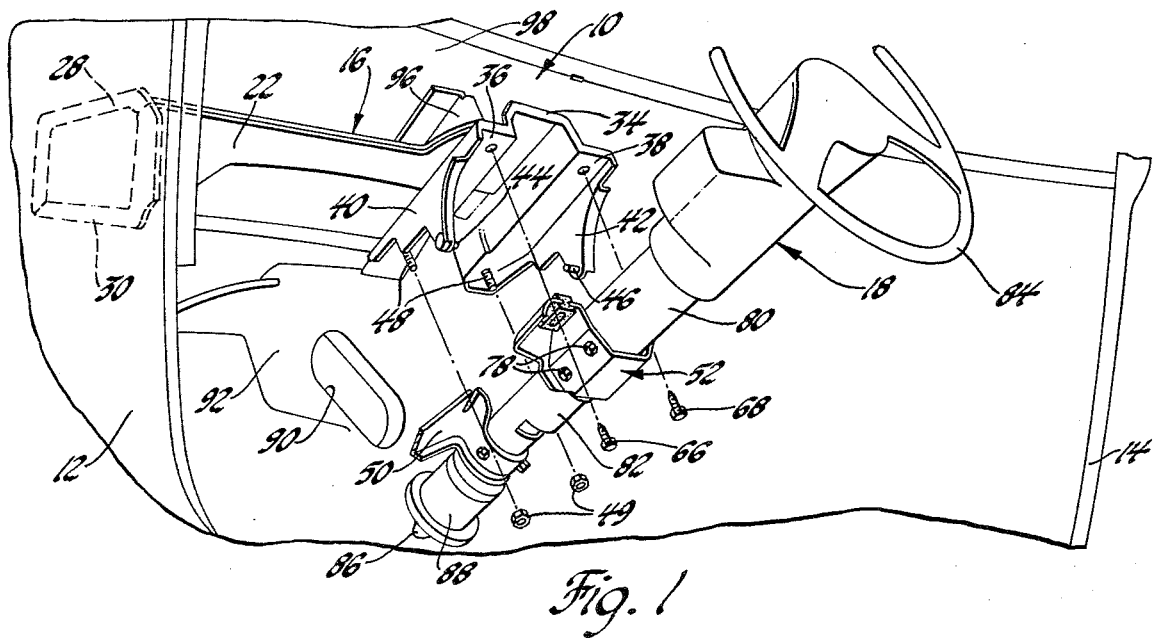
FIG. 1 is a perspective view of the portion of an interior of a vehicle with a vehicle steering column exploded from its support within the vehicle.
Figure 2:
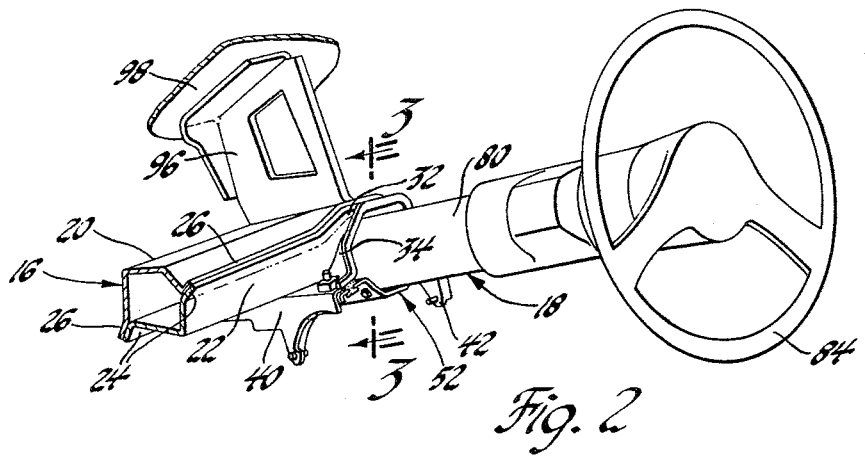
FIG. 2 is a perspective view of a portion of the support of FIG. 1 with the steering column attached thereto.
Figure 3:
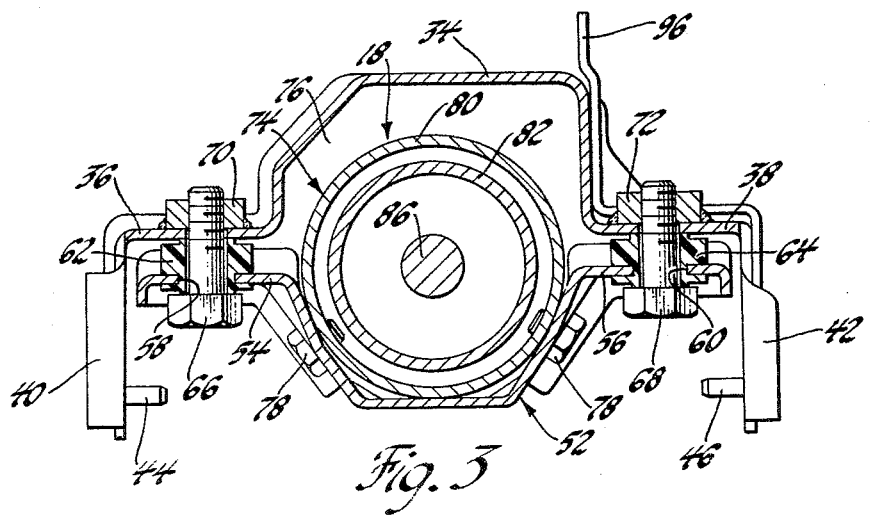
FIG. 3 is a view taken along lines 3—3 of FIG. 2.

Turning now in greater detail to the drawings, there is shown in FIG. 1 a forward portion of a vehicle body 10 of high strength steel having a pair of front door hinge pillars 12 and 14 that are laterally spaced from one another and that extend upwardly from the vehicle floor. Projecting laterally from the hinge pillar 12 and toward hinge pillar 14 is a support beam assembly 16 for a steering column assembly 18. As shown in the drawings, the support beam assembly comprises upper and lower halves 20 and 22 each stamped or otherwise formed from a high strength steel. Each of the halves is channeled lengthwise and is formed with outwardly extending side flanges 24 and 26 which are welded or otherwise connected to form a hollow tube shown best in FIGS. 1 and 2. The outboard ends of the halves 20, 22 are also flanged outwardly at 28 and 30 to form a base which is welded or otherwise rigidly secured to the inner side of hinge pillar 12. As shown best in FIG. 2, the support beam assembly has an inboard end 32 forming an upper cradle for accommodation of a shell-like guide bracket 34 welded or otherwise attached thereto. The guide bracket 34 is a sheet metal shell having an inverted U-cross sectional shape with laterally extending flanges 36, 38. Extending downwardly from the outboard edges of these flanges are a pair of ears 40, 42 that have fasteners 44, 46 extended inwardly to position and fasten an instrument panel, not shown, within the interior of the vehicle body. In addition the flanges of the guide bracket 34 also carry at their lower ends threaded fasteners 48 which extend downwardly and receive nuts 49 for the attachment of a lower bracket member 50.

Immediately below and cooperating with the guide bracket 34 is a sheet metal capsule bracket 52 generally U-shaped in cross section with a pair of laterally extending flanges 54 and 56 which correspond to the flanges 36 and 38 of the guide bracket. The flanges of the capsule bracket have longitudinally extending slots 58 and 60 therein which lead from the upper end edge of the bracket assembly thaat slidably receive plastic pull-away capsules or slides 62 and 64. Threaded fasteners 66 and 68 extend upwardly through respective elongated slots in the capsules through the top flanges 36 and 38 into threaded engagement with the weld nuts 70 and 72 rigidly secured to the upper side of flanges 36 and 38. These capsules releasably secure a steering column assembly 18 to the guide bracket and to the support beam. The steering column assembly, which is preferably a telescope energy absorbing column, extends through the opening 76 formed by the guide bracket and capsule bracket. Threaded fasteners 78 are employed to rigidly secure the guide bracket to the steering column as indicated in FIG. 1.

The steering column assembly and guide bracket assembly are similar in construction and operation to that of U.S. Pat. No. 3,877,319, issued Apr. 15, 1975 to Cooper, the disclosure of which is hereby incorporated by reference. The steering column assembly 18 incorporates an upper jacket 80 whose tubular shell telescopically fits over the extending end of a cylindrical lower jacket 82. Preferably the steering column assembly incorporates ball-type energy absorbing devices such as described in the Cooper patent referenced above to dissipate any impact loads applied to the steering wheel 84 sufficient to telescopically collapse the upper and lower jackets with respect to one another. The steering wheel is operatively connected to a steering shaft assembly 86 such as described in the Cooper patent to permit the telescoping action of the column. Element 88 disposed at the inner end of the steering column assembly is a cylindrical cover providing an attachment for a flexible boot, not shown. The steering shaft assembly extends through a passage 90 formed in the forward wall 92 of the vehicle passenger compartment and into operative connection with vehicle steering gear and linkages not illustrated.

To provide for additional support of the cantilevered support beam assembly 16, a web-like brace member 96 extends from connection with the upper portion of the guide bracket 34 to secure attachment, such as by welding, with the underside of the laterally extending cowl bar 98. With the brace member and the cantilevered attachment of the support beam a rigid triangulated support of the steering column assembly is provided. The instrument panel which is not illustrated covers the support beam assembly, the guide and capsule brackets and other structures. With this construction increase of front space for the vehicle operator is compared to many prior art arrangements.

It will be appreciated that the cantilevered support beam assembly of this invention provides a new and improved stabilized support of a steering column for a vehicle. With rigid connection with the door hinge pillar adjacent to the steering column and with auxiliary bracing to the cowl bar the support beam assembly is disposed away from fire wall construction and will not be disturbed by the displacement of components forward of the steering column in the event of severe front impacts. With this improved support, the steering column telescopes linearly to efficiently absorb impact energy with the capsules pulling out of their slots in bracket 52 as the upper jacket telescopes over lower jacket 82.

While a preferred embodiment of the invention has been shown and described to illustrate the invention, other modifications will become apparent to those skilled in the art. Accordingly, the scope of this invention is set forth in the following claims.

The embodiments of the invention in which an exclusive property or privilege is claimed are defined as follows:

1. In combination in a vehicle body having an upwardly extending hinge pillar for a vehicle door, a cantilever support beam extending transversely to the longitudinal axis of the vehicle body from said hinge pillar to a terminal end within said vehicle body, fastener means rigidly attaching one end of said support beam to said hinge pillar, a guide bracket secured to said terminal end of said support beam, bracket means secured to the underside of said guide bracket providing an opening therethrough, an elongated steering column extending along a longitudinal axis and normal to the axis of said transversely extending support beam and through said opening, and fastener means supporting said steering column within said opening in a predetermined location within said vehicle body, and brace means secured to said guide bracket for attaching the said terminal end of said support beam to said vehicle body so that said steering column is stabilized for operation by the vehicle operator.

2. In combination with a vehicle body having a pair of laterally spaced and upstanding hinge pillars for the left and right side doors thereof, a cantilever support beam extending transversely in said vehicle body from a first of said pillars toward a second of said pillars, attachment means rigidly securing the outboard end of said support beam to said first of said pillars between the upper and lower extremities thereof, an inclined steering column extending generally longitudinally in said body, guide bracket means secured to the inboard end of said support beam, connector means securing said steering column to said guide bracket means so that said column crosses the support beam at a predetermined angle and to stabilize the position of said steering column within said vehicle body, and said connector means comprising capsule means attaching said column to said bracket means to permit the forward movement of said steering column in response to an impact load applied thereto.

3. in combination with a vehicle body having a pair of laterally spaced and upstanding door hinge pilars for the left and right side doors thereof, a cantilever support beam extending transversely from a first of said pillars toward a second of said pillars, attachment means rigidly securing the outboard end of said support beam to said first of said pillars between the upper and lower extremities thereof, a collapsible energy absorbing steering column extending longitudinally in said body and disposed at a predetermined angle therein and across said support beam, guide bracket means secured to the inboard end of said support beam, connector means releasably securing said steering column to said guide bracket means to stabilize the position of said steering column and to permit said column and to linearly and telescopically collapse and absorb the energy of impact loads directed thereto.

* * * * *